Sept. 12, 1939.　　　　E. R. PARK　　　　2,173,024
PORTABLE COOKING UTENSIL STAND
Filed April 11, 1938
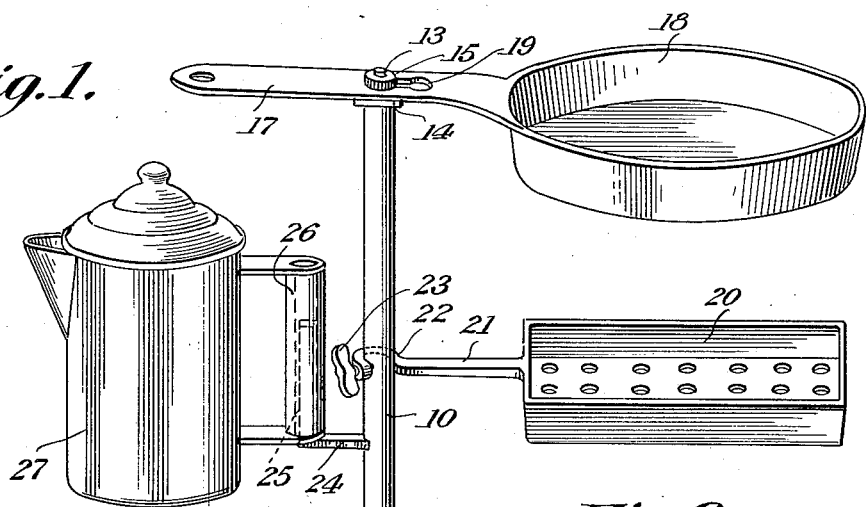
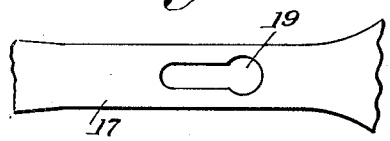
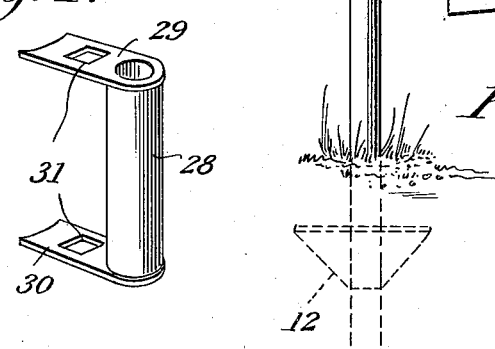
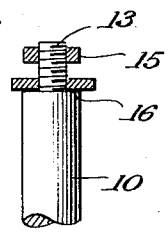
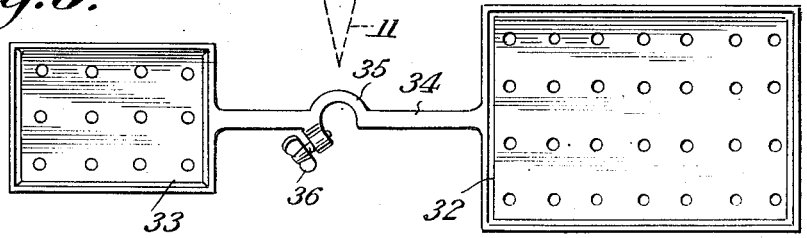
Emory R. Park
INVENTOR
BY Victor J. Evans & Co.
ATTORNEYS Patented Sept. 12, 1939

2,173,024

UNITED STATES PATENT OFFICE 2,173,024

PORTABLE COOKING UTENSIL STAND

Emory R. Park, La Grange, Ga.

Application April 11, 1938, Serial No. 201,384

2 Claims. (Cl. 126—30)

The invention relates to a portable equipment for campers or the like and more especially to a portable cooking utensil stand, being adaptable for specially designed utensils and carrying clamps and holding devices therefor.

The primary object of the invention is the provision of a stand of this character, wherein a variety of cooking utensils or vessels can be held thereon in a convenient manner for cooking purposes, the stand being readily handled for the erection thereof for use or for the bringing of the same into a compact condition for the storage of the same when not in use.

Another object of the invention is the provision of a stand of this character, wherein the cooking vessels or utensils when upon the same for use for cooking will be firmly and securely held and such vessels or utensils can be properly located to a fire on the ground, the stand being usable for outdoor cooking and particularly by persons camping in the open, the stand being novel in construction, unique and possessed of special characteristics so that a variety of cooking utensils or vessels may be supported thereby when set up for use.

A further object of the invention is the provision of a stand of this character, which is simple in its construction, thoroughly reliable and efficient in operation, susceptible of being set up for use with dispatch and when not in use will occupy the least possible space for the storage thereof, strong, durable and inexpensive to manufacture.

With these and other objects in view, the invention consists in the features of construction, combination and arrangement of parts as will be hereinafter more fully described, illustrated in the accompanying drawing, which discloses the preferred form of embodiment of the invention and pointed out in the claims hereunto appended.

In the accompanying drawing:

Figure 1 is a perspective view of a stand constructed in accordance with the invention showing a plurality of cooking vessels or utensils supported thereby for use in cooking by a camp fire or otherwise in the open, the stand being set up for this purpose.

Figure 2 is an enlarged fragmentary top plan view of the handle of one of the cooking utensils carried by the stand and removed therefrom.

Figure 3 is a fragmentary elevation partly in section of the upper portion of the stand.

Figure 4 is a perspective view of the handle of another vessel or utensil to be supported by the stand and is a modification of the form shown in Figure 1.

Figure 5 is a top plan view of a dual charcoal burner gadget for use with the stand, being a modification of the type shown in Figure 1.

Similar reference characters indicate corresponding parts throughout the several views in the drawing.

Referring to the drawing in detail, particularly Figures 1 to 3 inclusive, the stand constituting the present invention as one embodiment thereof comprises a post 10 preferably made from metal and in this instance is of solid rod formation having a pointed lower end 11 adapted to be driven into the ground for the disposition of said post 10 perpendicularly thereto and next to this end 11 on said post is an anchorage wing or fin 12 which when embedded within the ground prevents any turning of the post in its perpendicular position and augments secure anchorage of said post in the ground.

Formed at the upper end of the post 10 is a reduced externally threaded stud 13 having engaged thereon inner and outer clamping parts 14 and 15, respectively, the latter being in the form of a nut while the part 14 is in the form of a rest plate, being in contact with a shoulder 16 at the inner end of the stud 13. These parts 14 and 15 function for the detachable securing of the handle 17 of a cooking utensil such as a frying pan, skillet or the like 18. The handle 17 is provided with a keyhole-shaped slot 19 therein so that the nut 15 will pass freely through the larger portion of the said slot to allow stud 13 to pass into the narrow portion of said slot 19 whereby on screwing home the nut 15 with relation to the part 14 the pan, skillet or the like 18 will be held fixed upon the stand to be disposed in a horizontal plane for its support over a camp fire, burner or contrivance for cooking.

The post 10 has fitted therewith a charcoal burner in the form of a perforated tray, basket or the like 20 having draft apertures in its bottom and at one end is formed with an arm 21 provided with a yoke-like clamping terminal 22 adapted to partially embrace the post 10 and this terminal is fitted with a winged set screw 23 adjustably fastening the burner in position with relation to a cooking utensil or vessel, being in this instance disposed a distance beneath the pan, skillet or the like 18. The burner 20 can be swung about the post 10 on adjustment thereof or raised and lowered the desired extent for cooking purposes.

At a determined point on the stand 10 is formed a hanger bracket 24 having an upstanding attaching portion 25 thereto to be accommodated within a socketed handle 26 of a cooking vessel or utensil such as a coffee or tea pot 27, being of any standard type excepting the handle 26 hereinbefore described. This pot 27 when carried upon the stand can be fired for the cooking of its contents.

In Figure 4 of the drawing there is shown a slight modification of a handle 28 for a cooking utensil or vessel and in this instance the upper and lower extensions 29 and 30, respectively, for the said handle 28 in spacing it from the vessel or utensil (not shown) has formed therein squared holes 31, these being adapted to accommodate an attaching portion of a bracket corresponding to the bracket 24 so that the vessel or utensil can be carried and supported on the stand, being releasable or separable therefrom at will. The attaching portion of the bracket in cross section is shaped correspondingly to the openings 31 to avoid any possibility of the swing of the vessel or utensil when upon the stand.

In Figure 5 of the drawing there is shown a slight modification of a charcoal burner wherein there is arranged a pair of opposed spaced trays, baskets or the like 32 and 33, respectively, being joined with each other through the medium of an arm 34 therebetween and integral with the same. This arm at a central point is provided with a clamping yoke 35 equipped with a winged set screw 36 for the fastening of the yoke 35 about the post 10 and in this modified form of burner dual cooking may be had in that two cooking utensils or vessels may be fired at the same time. The burners are adapted to be placed the proper distance beneath the cooking utensils or vessels for the proper cooking operation of the contents thereof.

Of course, in the use of the stand it is adapted for special utensils, although it can be employed for the standard type of cooking utensil.

What is claimed is:

1. A stand of the character described comprising a post, a clamp carried at the uppermost end of the post and including an externally threaded stud and a nut threaded thereon, a pan having a keyhole-shaped slot for receiving the stud and allowing insertion of the nut thereinto with the stud engaged therein for clamping action by said clamp, and an anchoring wing carried by said post close to an anchoring end thereof.

2. A stand of the character described comprising a post, a clamp carried at the uppermost end of the post and including an externally threaded stud and a nut threaded thereon, a pan having a keyhole shaped slot for receiving the stud and allowing the insertion of the nut thereinto with the stud engaged therein for clamping action by said clamp, an anchoring wing carried by said post close to the clamp, a fuel holder on the post below the pan, and means separably connecting the holder to the post for swinging and vertical adjustments thereof.

EMORY R. PARK.